Figure 1:
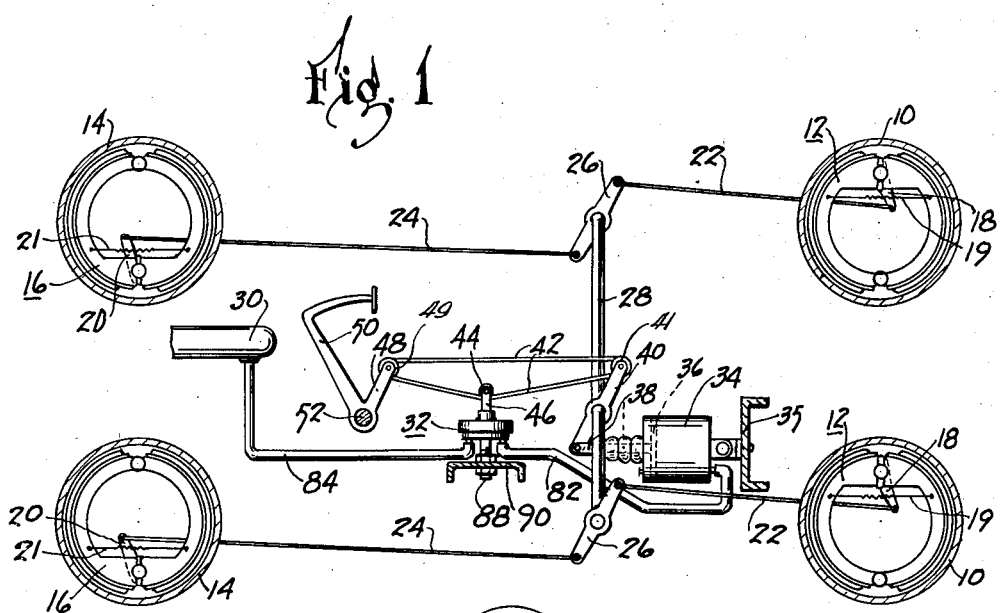

Jan. 26, 1937. R. P. BREESE 2,068,942
POWER OPERATOR CONTROL MECHANISM
Filed April 18, 1934

INVENTOR.
Robert P. Breese
BY Jerome R. Cox
ATTORNEY.

Patented Jan. 26, 1937

2,068,942

UNITED STATES PATENT OFFICE 2,068,942

POWER OPERATOR CONTROL MECHANISM

Robert P. Breese, South Bend, Ind., assignor to Bendix Aviation Corporation, South Bend, Ind., a corporation of Delaware Application April 18, 1934, Serial No. 721,177

2 Claims. (Cl. 188—152)

This invention relates to improvements in power actuators, especially those for use in connection wtih automotive vehicles. The invention is especially useful in the operation of the brakes of such a vehicle by suction or other power actuated means, the suction in the illustrated arrangement being obtained by means of a suction duct connected with the induction passage of the internal combustion engine which propels the vehicle. The suction duct connects with the manifold between the throttle valve of the carburetor and the cylinders of the engine. In this portion of the induction passage a maximum vacuum represented by approximately 20 inches of mercury on the vacuum gauge is obtainable at sea level when the throttle valve is closed. Sufficient vacuum is therefore available to actuate the power means, which in turn applies the brakes of the vehicle.

An object of the invention is to provide power means for actuating the brakes controlled by a pressure reactionary diaphragm or piston type of valve operable by the pressure exerted by the operator through a non-stretching but flexible connection.

Another object of the invention is to provide a valve actuating mechanism which may be actuated by a relatively light pressure on the foot pedal at first, but which requires an increasing pressure by the operator as the brake is progressively applied.

A still further object of the invention is the provision of means whereby as the brake is applied the ratio of the reaction on the foot pedal to the brake applying pressure increases.

A further object of the invention is to provide a power actuating mechanism in which adjustments for the degree of vacuum may be made by changing the position of the valve casing.

A still further object is to provide a power actuated brake mechanism in which an increased pedal pressure is required by the operator to increase the setting of the brakes, due to increased differential of pressures created within the valve.

One of the important features of the embodiment disclosed in illustration of my invention is the arrangement of a tension connection which as it is straightened causes the valve to exert an increasing reaction on the pedal.

According to the novel connection by means of which the brakes are applied an increasing force is required to actuate the brakes as they are progressively applied.

Having these objects in mind, one embodiment of the invention includes, in combination with the power actuator and the usual operating pedal or its equivalent, a connection which controls the power and at the same time transmits a reaction back to the pedal so that the driver may graduate his pressure and the applied power accurately according to the desired resultant. In one very desirable and simple arrangement, the valve or other control means is connected to a flexible element connected to the pedal and straightened by the depression of the pedal, and which has the auxiliary function of transmitting the manual power directly from the pedal to the brake connections.

In the illustrative accompanying drawing, this connection is shown as a flexible tension member having sections something like the links of a toggle, which straightens in applying the brakes manually, and which moves transversely the operative part of a valve to control the application of the power. Thus, while the valve opening force reacts on the pedal in the desired manner, this force is not lost but is also applied directly to the brakes. Moreover, the described connections are very simple, and inexpensive, although completely effective.

Other objects, features, and advantages of the present invention will be more apparent from the following detailed description, together with the accompanying drawing which is submitted merely to illustrate the invention and is not intended to define the scope thereof, reference being had for that purpose to the subjoined claims.

Figure 2:
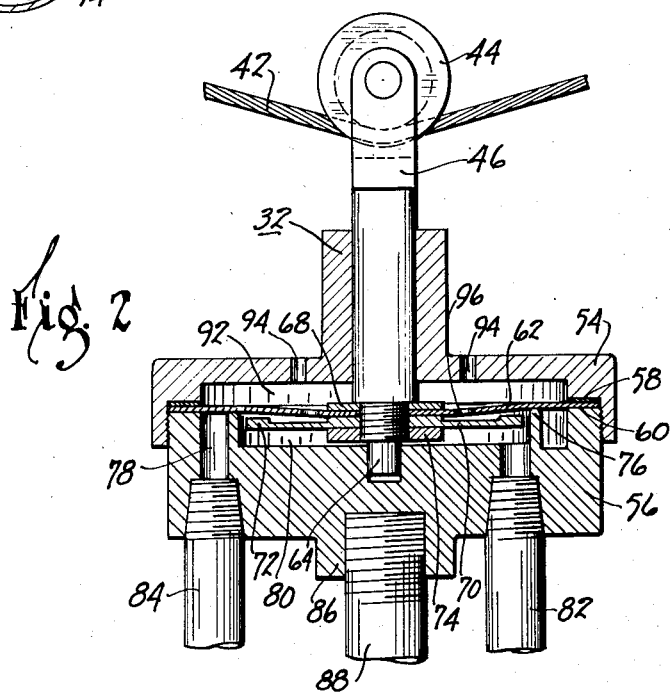

In the drawing wherein similar reference characters refer to similar parts throughout the several views:

Figure 1 is a diagrammatic view of a vacuum actuated brake mechanism embodying the invention; and Figure 2 is an enlarged sectional view of the control valve mechanism shown in Figure 1.

Referring to the embodiment of the invention disclosed in Figure 1 there is shown diagrammatically a portion of an automotive vehicle having driving wheels 10 equipped with braking mechanism 12 and steering wheels 14 having braking mechanism 16. The brake mechanisms 12 and 16 are formed of two relatively movable members adapted to be urged into engagement by means of levers 18 and 20 respectively. The usual return springs 19 and 21 are provided to hold the brake normally in the released position. Levers 18 and 20 are actuated by means such as tension elements 22 and 24 connected to the opposite ends of levers 26, said levers being secured to a cross shaft 28. It is thus apparent that in order to apply the brakes on all four wheels it is only necessary to rotate the cross shaft 28 in the counterclockwise direction as viewed in Figure 1.

Power means is supplied to rotate the cross shaft 28, the illustrated type being one in which the subatmospheric pressure or vacuum existing in the manifold 30 of the usual engine is controlled by means of a valve 32 to actuate a power motor including a cylinder 34 and a piston 36 slidable therein. The cylinder 34 is shown pivotally connected to a fixed member 35 of the chassis of the vehicle. The piston 36 is secured to a piston rod 38 which is connected to one end of a lever 40 fixed to the cross shaft 28, or other suitable shaft-operating means.

According to an important feature of the invention, the power is controlled by the operating means for the shaft 28 or its equivalent. In the arrangement shown in the drawing, and which is especially well adapted for use with mechanical brakes, a flexible belt cable 42 passes around a roller 44 carried by the valve stem 46. It also passes around a roller 41 mounted on the lever 40 and another roller 49 mounted on the crank 48 fixed to the brake pedal 50.

The control valve mechanism 32 comprises, a valve casing having two members 54 and 56 which are conveniently provided respectively with interior and exterior threaded portions, the casing members being provided with annular clamping portions 58 and 60 so that they may be screwed together upon the marginal portions of a diaphragm 62 to effect a sealing engagement between the edges of the diaphragm and the casing. The diaphragm 62 is provided with a central aperture through which a reduced portion 64 of the valve actuating stem 46 extends. The stem 46 also extends through a central aperture in the casing member 54, and is provided within the casing with a shoulder 66. A metal washer 68 is interposed between the shoulder 66 and the diaphragm 62. In rear of the diaphragm the reduced portion 64 extends through a disc valve 70, having annular portions 72 for engaging the diaphragm, and for making an air-tight connection therewith. The disc valve 70, diaphragm 62 and the washer 68 are clamped together against the shoulder 66 by a nut 74 on the reduced portion of the valve stem 46. The casing member 56 is also provided with an annular seat indicated at 76 for normally engaging the diaphragm 62 and forming an air-tight connection therewith when the valve mechanism is in released position as shown in Figure 2. This seat divides the casing member 56 into an exterior annular chamber 78 and an interior central chamber 80. The central chamber 80 is connected by a pipe 82, (having a portion thereof flexible) with the cylinder 34 of the actuator, between the piston 36 and the closed end of the cylinder. The annular chamber 78 of the valve casing is connected by a pipe 84 (having a portion thereof flexible) with the manifold 30 of the engine. The movement of the valve stem 46 in the opening direction is limited by the engagement of the metal washer 68 with the inner face of the casing member 54 thus providing a limited amount of lost motion between the valve stem 46 and the valve casing 56. The casing member 56 is provided with a depending hub 86 internally threaded to receive a rod 88 by means of which the valve is adjustably attached to a fixed member 90 of the chassis.

The casing member 54 is provided with a chamber 92 on the upper side of diaphragm 62, the chamber being at all times in communication with the atmosphere through apertures 94 in the casing member 54. The diaphragm 62 is provided with an inlet aperture 96 within the annular sealing portion 72 of the disc valve 70.

It will be noted that the valve stem 46 projects through an aperture in the wall of the casing member 54, both sides of which are subjected to atmospheric pressure. The portion of the interior of the casing member adjacent to this wall is always sealed from the portions of the casing where vacuum exists by the diaphragm 62 or the disc valve 70. Thus it is unnecessary to provide an air-tight joint between the valve stem 46 and casing member 54.

Assuming that the parts of the valve mechanism are in the released position, indicated in Figure 2, and the engine is running at idling speed, subatmospheric pressure will exist in the manifold 30 and air will be exhausted from the pipe 84 and the annular chamber 78. In this position of the valve the central chamber 80 is not subjected to subatmospheric pressure because the diaphragm 62 is in sealing contact with the seat 76. Valve stem 46 being in its extreme downward position, the sealing portions 72 of the disc valve 70 are not in contact with the diaphragm 62 so that the cylinder 34 is subjected to atmospheric pressure through the pipe 82, chamber 80, apertures 96 in the diaphrgam 62 and the apertures 94 in the valve casing 54. In this position the diaphragm 62 is subjected to atmospheric pressure on both faces so that the pressures thereon are equalized. The piston 36 in cylinder 34 is thus subjected to atmospheric pressure or both faces.

To apply the brakes the operator depresses the brake pedal 50 which by means of the crank 48 pulls on the cable 42, thereby owing to its novel arrangement, tending to straighten it out. As cable 42 straightens the valve stem 46 is withdrawn from the casing member 54. The roller 44 fixed to the stem 46 permits longitudinal movement with respect to cable 42. As the valve stem 46 rises the sealing portions 72 of the disc valve 70 engage the diaphragm 62 and close off communication between the cylinder 34 and the air inlet apertures 94 and 96. As soon as the disc valve 70 has been moved into engagement with the diaphragm 62, the further movement of the pedal 50 will move the diaphragm 62 away from the annular seat 76, upon which it is normally held in the released position of the valve mechanism due to suction in the chamber 78. The cylinder 34 and the chamber 70 are thereby connected with the annular suction chamber 78 and thus with the manifold 30 by means of the pipe 84.

Exhaustion of the air in the cylinder to the right of the piston 36 will immediately begin, and the piston will move to the right under the action of atmospheric pressure on its left face. As the degree of rarefaction in the cylinder 34 and within the casing member 56 of the valve increases, the differential of fluid pressure on the diaphragm, the forward face of which is always exposed to atmospheric pressure, will increase in direct proportion to the increase in the differential of fluid pressures in the power actuator.

If the forward movement of the brake pedal 50 is interrupted, a slight continuation of movement of the piston 36 will permit the diaphragm 62 to reengage its seat 76, without opening the disc valve 70. The brakes are thus held as applied. This operation is possible because the cable 42 and the piston rod 38 are connected to opposite ends of the lever 40 fixed to the cross shaft 28.

If the operator releases the pressure on the brake pedal 50 sufficiently to permit the disc valve 70 to disengage the diaphragm 62, air will be admitted to the cylinder 34 and the brakes thereupon released. The brakes may however be reapplied by a slight forward movement of the brake pedal 50 sufficiently to again bring the disc valve 70 in contact with the diaphragm 62 and move the latter away from its seat. To reapply the brakes the operator will again have to overcome the resistance due to the differential of fluid pressures on the opposite faces of the diaphragm.

When the power actuator has applied its maximum power, the operator may further depress the pedal 50 so as to tension cable 42 and thereby exert his physical force to further apply the brakes. According to the novel device thus provided the operator may apply the brakes manually in event the engine stalls or for any reason fails to furnish sufficient vacuum for the satisfactory operation of the brakes.

Since the force exerted by the operator to overcome the resistance of the valve is applied through the flexible belt 42 passing around the roller 41 on the lever 40, and since the leverage approaches infinity as the cable 42 straightens, very little energy is lost and practically all of the force exerted by the operator is employed to actuate the brakes.

The reaction on the pedal thus increases proportionately as the brakes are applied. The force exerted by the operator to apply the brakes through crank 48, may be resolved into two components, one vertical effective to lift valve stem 46, the other horizontal effective to rotate lever 40. The force exerted to lift valve stem 46 vertically is resisted by the differential of fluid pressures on the portion of diaphragm 62 within the annular seat 76 multiplied by the area of that portion of the diaphragm. The force exerted by the power actuator through the lever 40 is proportional to the differential of fluid pressures on the opposite faces of the piston 36 multiplied by the area of the piston 36. It is thus apparent that the reaction on the brake pedal 50 increases proportionately to the area of diaphragm 62 within the annular seat 76 divided by the area of the piston 36, or the reaction on the brake pedal is substantially proportionate to the power exerted by the power cylinder.

While one illustrative embodiment has been described in detail, it is not my intention to limit the scope of the invention to that particular embodiment, or otherwise than by the terms of the appended claims.

I claim:

1. In a brake system for automotive vehicles, a brake mechanism, a power actuator having a cylinder, a piston slidable in the cylinder, connecting means between the brake mechanism and the power actuator, means for anchoring a portion of the power actuator to the vehicle, manual means to apply the brakes, a roller carried by said manual means, control means for the power actuator having two relatively movable members, one member being fixed to the vehicle, a roller carried by the other member, a roller carried by the first-named means and flexible means connecting all three rollers.

2. In apparatus for the control of a pneumatic power device, a manually controlled lever, a valve, a continuous belt cable connected to said lever, a member offering resistance to which another portion of said cable is connected, and means operated by the cable in tensioning for actuating said valve.

ROBERT P. BREESE.